US011533434B2

(12) United States Patent
Faaborg et al.

(10) Patent No.: US 11,533,434 B2
(45) Date of Patent: Dec. 20, 2022

(54) GENERATING AND RENDERING MOTION GRAPHICS EFFECTS BASED ON RECOGNIZED CONTENT IN CAMERA VIEW FINDER

(71) Applicant: Google LLC, Mountain View, CA (US)

(72) Inventors: Alexander James Faaborg, Mountain View, CA (US); Kankan Meng, Mountain View, CA (US); Joost Korngold, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 16/948,384

(22) Filed: Sep. 16, 2020

(65) Prior Publication Data

US 2021/0084233 A1    Mar. 18, 2021

Related U.S. Application Data

(60) Provisional application No. 62/901,904, filed on Sep. 18, 2019.

(51) Int. Cl.
*H04N 5/232* (2006.01)
*G06F 3/04817* (2022.01)
*G06V 20/20* (2022.01)

(52) U.S. Cl.
CPC ... *H04N 5/232939* (2018.08); *G06F 3/04817* (2013.01); *G06V 20/20* (2022.01)

(58) Field of Classification Search
CPC .............................................. H04N 5/232939
See application file for complete search history.

(56) References Cited

U.S. PATENT DOCUMENTS 10,026,229 B1   7/2018   Yalniz et al.
2010/0321389 A1  12/2010   Gay et al.
(Continued)

FOREIGN PATENT DOCUMENTS

EP   2560145 A2 *  2/2013   ........... G06T 19/006
EP   2560145 A2     2/2013

OTHER PUBLICATIONS

International Search Report and Written Opinion for PCT Application No. PCT/US2020/070548, dated Mar. 4, 2021, 10 pages.

*Primary Examiner* — Roland J Casillas
(74) *Attorney, Agent, or Firm* — Brake Hughes Bellermann LLP

(57) ABSTRACT

Systems and methods are described for providing co-presence in an augmented reality environment. The method may include receiving a visual scene within a viewing window depicting a multi-frame real-time visual scene captured by a camera onboard an electronic device associated with the augmented reality environment, identifying a plurality of elements of the visual scene, detecting at least one graphic indicator associated with at least one of the plurality of elements, detecting at least one boundary associated with the at least one element, and generating, in the viewing window and based on the detection of the at least one graphic indicator, Augmented Reality (AR) motion graphics within the detected boundary. In response to determining that content related to the at least one element is available, the method may include retrieving the content and visually indicating an AR tracked control on the at least one element within the viewing window.

20 Claims, 10 Drawing Sheets

(56) References Cited

U.S. PATENT DOCUMENTS

2013/0124326 A1   5/2013  Huang et al.
2014/0168056 A1*  6/2014  Swaminathan ....... G06F 3/0481
                                                            345/156

* cited by examiner

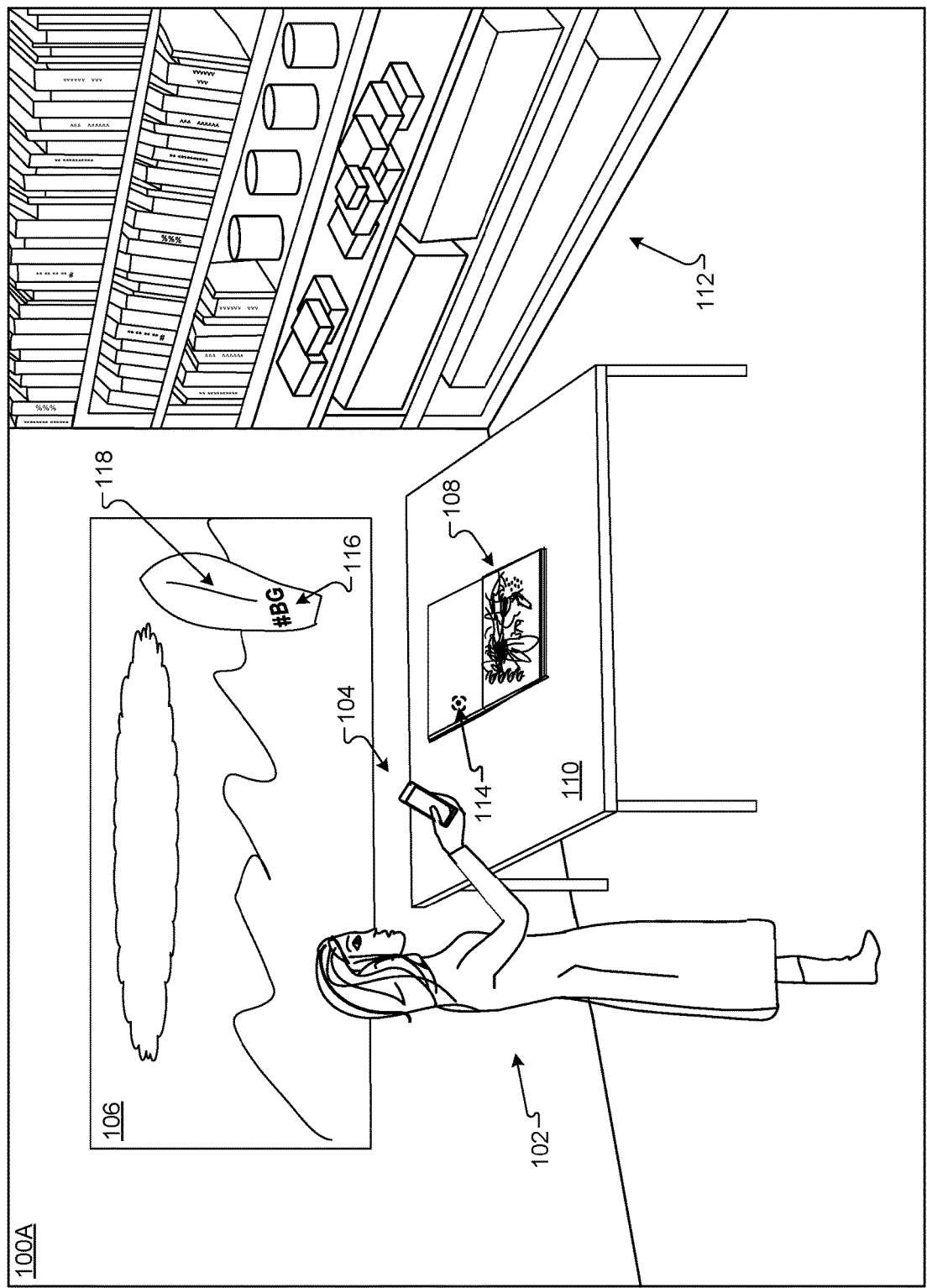

GENERATING AND RENDERING MOTION GRAPHICS EFFECTS BASED ON RECOGNIZED CONTENT IN CAMERA VIEW FINDER

CROSS-REFERENCE TO RELATED APPLICATION

This application claims the benefit of U.S. Provisional Patent Application No. 62/901,904, filed on Sep. 18, 2019, entitled "GENERATING AND RENDERING MOTION GRAPHICS EFFECTS BASED ON RECOGNIZED CONTENT IN CAMERA VIEW FINDER", which is incorporated by reference herein in its entirety.

TECHNICAL FIELD

This document generally relates to approaches for generating motion graphics of elements included in a visual scene of a camera view finder based on recognizing content in the view finder.

BACKGROUND

Electronic devices, such as smartphones and tablets, continue to evolve and provide consumers with new and/or improved functional capabilities. For instance, such devices can capture a visual scene using a camera included in the device. Such devices, using artificial intelligence, computer-vision and/or machine-learning can identify content within a given view and provide (e.g., obtain) information on the identified content. Possibilities exist, however, for additional approaches for providing information relevant to a user for content within a given visual scene.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for depicting AR content is provided. The method may include receiving, by an electronic device, a visual scene within a viewing window depicting a multi-frame real-time visual scene captured by a camera onboard the electronic device, identifying, by the electronic device, a plurality of elements of the visual scene, detecting, by the electronic device and based on the plurality of elements identified in the visual scene, at least one graphic indicator associated with at least one of the plurality of elements, detecting, by the electronic device, at least one boundary associated with the at least one element, and generating, in the viewing window and based on the detection of the at least one graphic indicator, Augmented Reality (AR) motion graphics within the detected boundary. In response to determining that content related to the at least one element is available, the method may include retrieving the content and visually indicating an AR tracked control on the at least one element within the viewing window.

Implementations may include any or all of the following aspects. In some implementations, the method also includes dissipating the AR motion graphics in response to determining that content related to the at least one element is unavailable. In some implementations, the AR motion graphics include animated effects initiated at a location of the at least one graphic indicator and expanded to the boundary, the animated effects including moving elements presented within the detected boundary.

In some implementations, the AR tracked control is a play button configured to initiate, in the viewing window, an immersive AR experience with the content and the method may b further configured to receive, from a user accessing the electronic device, input at the play button triggers execution of the immersive AR experience.

In some implementations, the detected boundary defines an edge of the at least one element, the defined edge configured to contain the AR motion graphics to a portion of the visual scene. In some implementations, the graphic indicator is a logo and the AR motion graphics include a plurality of animated and non-overlapping shapes presented within the detected boundary. In some implementations, the at least one element is a virtual object and the detected boundary defines a surface of the virtual object. In some implementations, the at least one element is a virtual object and the detected boundary defines a volume of the virtual object. In some implementations, the retrieved content is based on a geographic location of the electronic device.

Implementations of the described techniques may include hardware, a method or process, and/or computer software on a computer-accessible medium. The details of one or more implementations are set forth in the accompanying drawings and the description below. Other features will be apparent from the description and drawings, and from the claims.

BRIEF DESCRIPTION OF DRAWINGS

FIGS. 1A-1B depict visual scenes that can be analyzed and modified using the approaches described herein.

Like reference symbols in the various drawings indicate like elements.

DETAILED DESCRIPTION

Figure 1B:
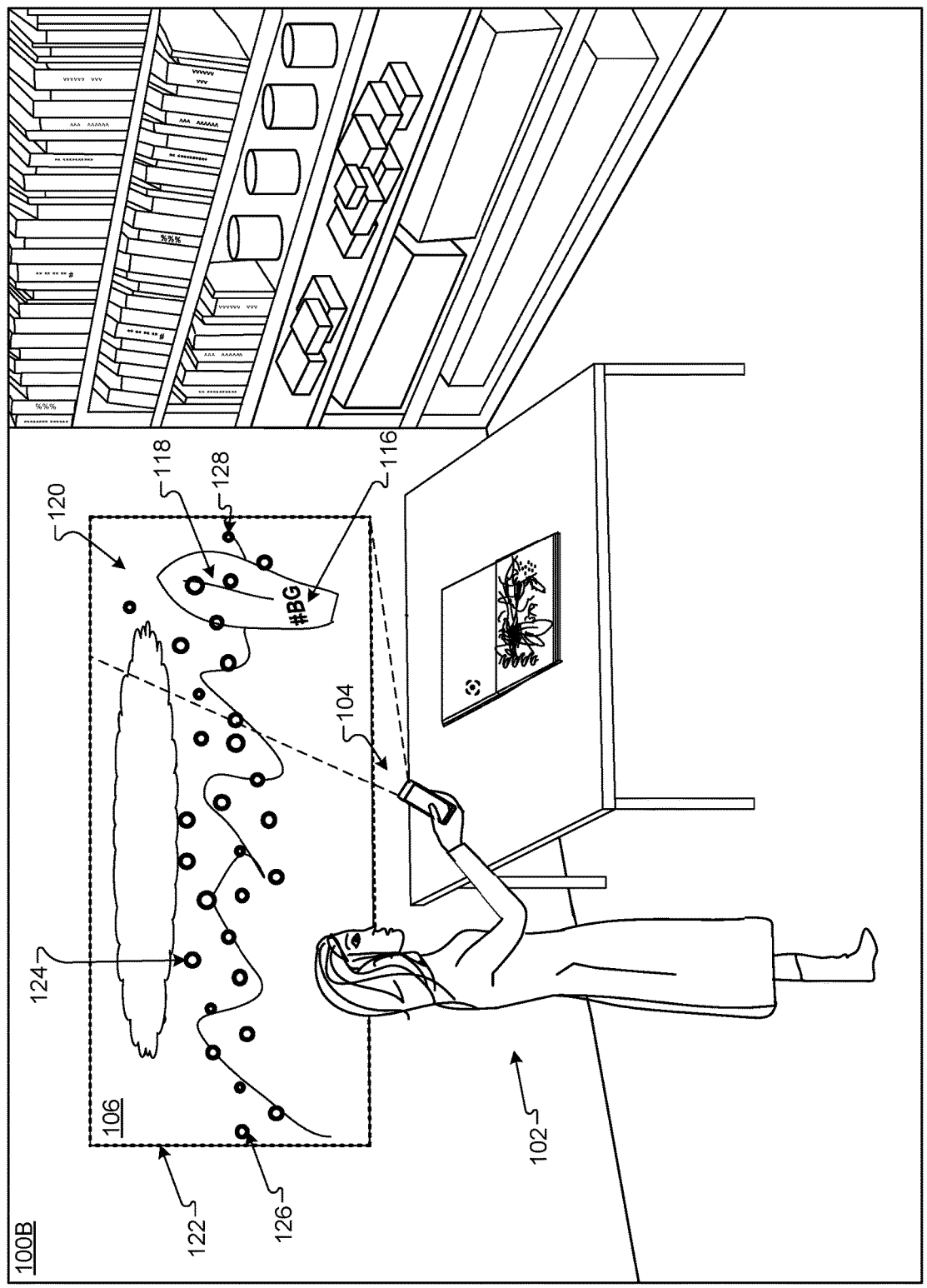

This document describes example approaches for generating motion graphics effects for aspects of a visual scene. The motion graphics effects may be triggered based on detecting one or more graphic indicators (e.g., content such as icons, logos, gleams, affordances, data, button, graphics, animations, images, etc.) within a visual display of an electronic device displaying the visual scene. The motion graphics effects may be Augmented Reality (AR) effects and content that is generated and/or rendered instantly (in real time) upon detection of such graphic indicators in a scene. The detection may be performed by (or with access to) a camera onboard the electronic device displaying the visual scene and graphic indicators.

In general, the motion graphics effects described herein may provide visual feedback for detected user interface (UI) content (e.g., logos, icons, content, elements, objects, etc.) The visual feedback may indicate, to a user of the electronic device, that additional content and/or information may be available for presentation. In some implementations, the visual feedback may indicate that additional content and/or information is in the process of being downloaded, streamed, and/or otherwise obtained for presentation to the user on the electronic device. In some implementations, the graphic indicators are printed (e.g., in the physical world) or rendered (in the virtual world) on particular objects.

The systems described herein may include motion graphics effects as visual indication(s) depicted on the display screen of the electronic device while generating, retrieving, or otherwise obtaining specific information about elements in a visual scene that correspond with the recognized content (e.g., graphic indicators) in the visual scene. The motion graphics effects may include, but are not limited to, highlighting items, enlarging items, fading in or out of items, obfuscating (e.g., dimming) portions of the visual scene in correspondence with the retrieved content associated with the one or more graphic indicators (e.g., logo) and/or other 2D or 3D visual effects, etc.

The systems and methods described herein can detect (e.g., recognize) within a particular scene and at the electronic device, an icon, logo, or other element, for example, to trigger generation of the visual feedback described herein. The icon, logo, or other element may be related to a brand, indicator, or data associated with electronic device (e.g., an embedded component in the software executed on the electronic device). The icon, logo, or other element may be related to a brand, indicator, or data associated with a viewed item or object within the view finder of a camera associated with the electronic device.

The systems and methods described herein may provide an advantage over conventional systems by providing a bounded perimeter or bounded volume for AR content that is displayable within a screen of a device. For example, the systems and methods described herein may ensure that particular AR content does not overextend into other content or elements in a scene. In some implementations, the systems described herein can utilize virtual object boundaries or edges, screen boundaries, text boundaries or edges, and/or other detectable surfaces, volumes, or shapes to ensure that AR content is bounded. In some implementations, the boundary may be determined based on contrast effects and/or texture changes between elements in a scene.

The systems and methods described herein may provide an advantage over conventional systems by providing indications to the user that additional content is available and accessible. The indications may be graphics that are user-friendly and non-intrusive while conveying to the user that additional contextually related content may be accessed. By using the boundary an intuitive and more efficient user interaction can be enabled that, e.g., can allow to fulfil certain tasks in a shorter time frame. This allows to save time and, in turn, e.g., battery consumption.

In general, the approaches described herein can be implemented using an electronic device, such as a smartphone, a tablet computer, Augmented Reality (AR) and/or Virtual Reality (VR) glasses/headsets, a laptop computer, etc. For instance, a user experience (UX) can be provided on an electronic device (e.g., as part of associated motion graphics effects functionality), where the UX can be configured to display a visual scene generated by a camera capture of real world content and to detect one or more recognized logotype (e.g., logo, graphic, mark, trademark, brand, image, emblem, character, symbol, animation, etc.) in the view window of the electronic device during capture of the scene. The recognized logo may represent a publicly identified symbol that enables recognition of a particular idea, product, name, person, device, or the like. In some implementations, the logo may be represented as a unique mark associated with a particular object or content. In some implementations, the logo may be represented as machine-readable code (e.g., a QR code, a Snapcode®, a barcode, etc.) that is detectable and readable by a camera in the electronic devices described herein.

The systems and methods described herein can use the detected (e.g., and recognized) logo to identify items (e.g., elements) within the visual display of the electronic device that are of interest in a scene depicted in a view display, for example. The items of interest may pertain to predefined and/or recognized logos (e.g., graphics, marks, trademarks, brands, images, emblems, characters, symbols, animations, etc.). The predefined and/or recognized logos may be associated with additional content related to the items of interest and such additional content may be retrieved upon the systems recognition of the logo, for example. In some implementations, the additional content is retrieved based on a geographic location of the electronic device (e.g., determined by means of a positioning system of the electronic device, e.g., a GPS). In some implementations, the logo may be predefined to correspond to content that may be retrieved and displayed to the user in the display of the electronic device based on capturing the logo in a view finder of the camera onboard the electronic device.

In the example implementations described herein, computer vision and/or machine learning can be used to identify (find, locate, etc.) and recognize individual elements (e.g., logos) in a visual scene to provide additional content received by, accessible to, etc. an electronic device. In some implementations, such a visual scene can be a multi-frame, real-time visual scene (e.g., a video) captured (i.e., dynamically captured) by a camera of the electronic device. In some implementations, a visual scene can be in the form of a single-frame image (e.g., a photograph) that is stored on, or provided to the electronic device. Identifying elements of a visual scene can include performing text recognition and/or image recognition on the visual scene. Also, the electronic device (e.g., working in conjunction with one or more other devices) can determine a context of the visual scene (e.g., using machine-learning, artificial intelligence, etc.) based on recognized text, recognized objects (e.g., logos), a geographic location (geo-location) of the visual scene (e.g., as determined by geo-location device included in the electronic device), and/or other information, such as user input. For instance, context of a visual scene can be determined based on comparison of text recognized in the visual scene with known vocabularies, comparison of objects (e.g., logos) identified in the visual scene with databases of known images, and/or a geo-location associated with the visual scene, etc.

For example, a user may use a camera of the electronic device to capture (view, etc.) an image of a book in a library. Using the approaches described herein, the image of the book may be analyzed, including recognition of text, logos, images, etc. in the book. Comparison of the recognized text, logos, and/or images with known vocabularies/content/data may indicate that the text, logo, and/or image is portraying that additional information or other content may be accessible in the book. Comparison of the recognized logos (or other images included in the book) with known images could match known images (or content) associated with the particular logo. Based on the foregoing analysis, the electronic device can match a particular logo, which may trigger retrieval of additional/auxiliary data associated with the logo and/or the element (e.g., book) shown in the scene. The systems and methods described herein may determine placement of the additional data and may determine placement and sizing for any motion graphics effects that may be displayed to the user before the additional data is displayed to the user on the screen of the electronic device.

As noted above, and discussed further below, in some implementations, an electronic device can include a UX that allows a user to view a visual scene (e.g., a real-time, multi-frame view, a single frame photographic view, etc.), and choose elements of the visual scene (e.g., declare intent to retrieve additional content by selecting a logo) that the user would like identified (highlighted, expanded, etc.) or removed (obfuscated, dimmed, etc.). The UX can be configured to provide the user a view of the respective visual scene (e.g., within the UX on a display of the electronic device) with visual indications corresponding with the user's declared intent (e.g., corresponding with the one or more identified logos).

Prior to depicting motion graphics and/or other AR content, the electronic device can analyze a respective visual scene to identify individual elements (e.g., logos, text, groupings of text, objects, etc.) of that visual scene. Upon recognition of a particular element (e.g., logo, text, grouping of text, objects, etc.), one or more visual indications (highlights, icons, obfuscation, dimming, etc.) can be depicted in a view of the visual scene in the UI while the electronic device obtains related information corresponding to the recognized element. In some implementations, the electronic device may be operating in conjunction with one or more servers accessible to the electronic device to obtain the related information. Upon obtaining the related information corresponding to the recognized element, the visual indications may be replaced by the related information, which may be presented in the display of the electronic device.

As noted above, computer-vision, machine-learning and/or artificial intelligence can be used to identify, segment and track of elements included in a visual scene, as well as to determine (e.g., interpret, understand) the context of the visual scene. Example approaches for performing such machine learning are discussed below with respect to FIG. 2. These implementations are discussed by way of example and for purposed of illustration, and other machine learning approaches can be used. The particular machine learning approach will depend, at least in part on the particular implementation, the particular image or visual scene being analyzed, etc.

In some implementations, an electronic device implementing the techniques described herein can operate in conjunction with one or more other devices, such as one or more server computers (e.g., Internet servers, database servers, etc.), or other appropriate devices, such as those described below with respect to FIG. 6. Such devices may assist in retrieval and/or provision of the additional information for particular elements and/or items in the scene.

FIG. 1A depicts a visual scene 100A that can be analyzed and modified using the approaches described herein. A user 102 is shown using an electronic device 104 ready to capture elements of the visual scene 100A in a view finder associated with an onboard camera of device 104. The visual scene 100A represents a physical scene in which the user may walk around. The visual scene 100A also includes a plurality of elements including at least a poster 106, a book 108, a table 110, and a book case 112. Any number of elements may be depicted in any particular scene. One or more elements may include a graphic indicator that may be recognized by an electronic device that captures a view of the graphic indicator. Recognition of such graphic indicators may trigger generation, placement, and display of motion graphics, text, and AR content to provide supplemental information about the elements (or other content) depicted in the scene.

Particular elements of a given visual scene 100A will depend on the particular implementation. Using the approaches described herein, the visual scene 100A can be captured by a camera onboard electronic device 104, for example, or may be otherwise provided to the device 104. Particular elements may include one or more graphic indicators (e.g., icons, logos, gleams, affordances, data, button, graphic, animation, image, video, etc.) that may be recognized by the camera onboard electronic device 104. For example, a graphic indicator 114 is an icon associated with content in the book 108. In another example, the poster 106 includes a graphic indicator 116 (e.g., #BG) on a surfboard 118. The visual indicator 116 may be a logo that represents a brand (e.g., Beach Gear) that manufactures beach related products. The poster 106 may be advertising content pertaining to the logo #BG (e.g., graphic indicator 116). The electronic device 104 may recognize any or all graphic indicators in a scene (e.g., logo 114 and logo 116). Recognition of such logos can trigger retrieval and display of information associated with the graphic indicators.

In operation, the electronic device 104 (e.g., using elements of FIG. 2) can receive any or all of the visual scene 100A in the screen (e.g., a viewing window, view finder, etc.) of the electronic device 104. In general, the electronic device may use an onboard camera to present multi-frame real-time visual in the screen of the electronic device 104. The electronic device 104 may then analyze the visual scene 100A to identify any number of elements, visual indicators, VR and/or AR content, etc.

As shown in FIG. 1B, the user 102 is accessing electronic device 104 and capturing a portion 120 of poster 106 in the screen (e.g., viewing window) of device 104. In the portion 120, the logo 116 (e.g., #BG) is captured. The logo may be a graphic indicator, as used throughout this disclosure. The graphic indicator may be associated with the poster 106 and other content or information retrievable from one or more sources. Here, the electronic device may detect (e.g., and recognized) the logo. Upon detection and recognition of the logo 116, the electronic device 104 may determine and/or detect at least one boundary (e.g., boundary 122) associated with the poster 106. The boundary 122 may then be visually indicated to the user. As shown here, the boundary 122 is a dotted line. However, in operation, the electronic device 104 may begin the boundary from the recognized poster 106 (or from the recognized logo 116) and move the boundary outward until recognizing an edge, a color change, a texture change, or other visual indicator to end a boundary.

The device 104 may then generate, in the viewing window of the device 104, AR motion graphics 124 (e.g., dots/circles) within the detected boundary. Other AR/VR motion graphics are also possible. The AR motion graphics 124 may include animated effects (e.g., dots growing, blinking, twinkling, etc.). The AR motion graphics 124 may be initiated at a location of the at least one graphic indicator (e.g., logo 116) and may expand to the boundary 122, as shown by dots 126 and 128. Such motion graphics may be used to indicate that additional information/content may be available for elements (e.g., surfboard 118) and recognized graphic indicators (e.g., logo 116). The motion graphics may be displayed while the device 104 retrieves the additional information/content. In response to determining that information/content is available for the poster 106, surfboard 118, and/or logo 116, the electronic device 104 may retrieve such information/content and may visually indicate (e.g., render, display, provide, etc.) an AR tracked control (e.g., a play button, a selectable object, a trigger, etc.) on the poster 106, surfboard 118, or logo 116 within the viewing window of device 104.

Figure 2:
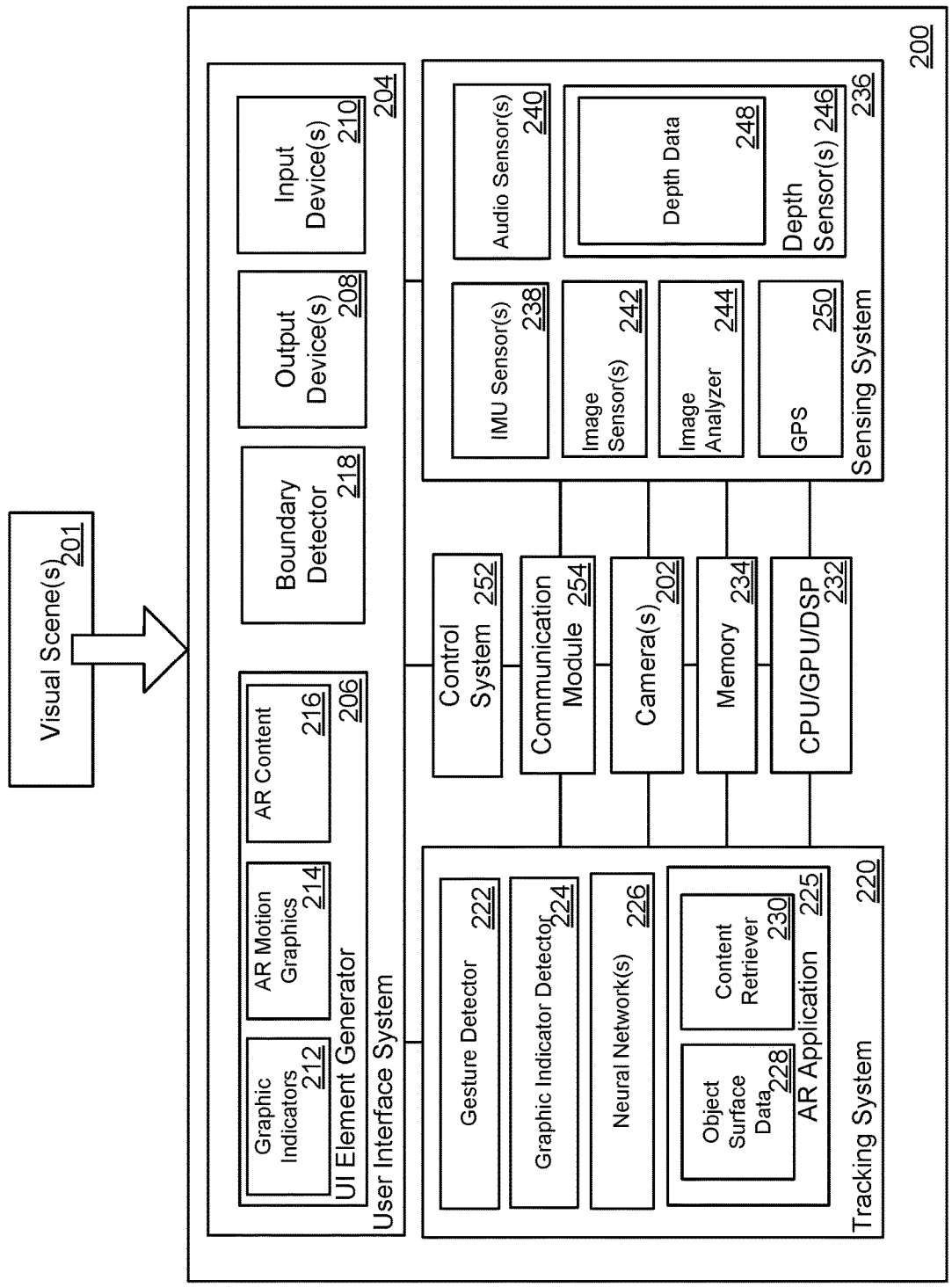
FIG. 2 is a block diagram illustrating a system configured to employ the approaches described herein, according to an example implementation.

FIG. 2 is a block diagram of an example electronic device 200 for traversing augmented reality (AR) experiences, in accordance with implementations described herein. In general, the device 200 may be (or have access to) an electronic device that can generate an augmented reality (or mixed reality) environment and provide UI elements and visual scenes 201 in a view finder of a camera 202 onboard the electronic device 200, as the user approaches particular objects in the physical space. The UI elements may include the icons, logos, or other graphic indicators described throughout this disclosure.

In some implementations, the device 200 is a mobile device operated by the user in the physical space. The mobile device may be used by a user accessing content (e.g., content captured in the view finder of camera 202). Accessing content with the mobile device may include detecting and/or selecting elements within the view finder to trigger display of additional content pertaining to the accessed content. For example, AR content, VR content, and/or mixed-reality (MR) content may be accessed from a server device, from a local memory on the mobile device, or from another device connected to or having access to a network accessible to device 200 when the device 200 detects that related information may be available (e.g., at the server device, at the local memory on the mobile device, or at the other device). In some implementations, the AR content, VR content, and/or MR content may be accessed locally on the electronic device 200. Additional related content may then be accessed over a network and provided on the electronic device 200.

In operation, electronic device 200 may detect a graphic indicator, such as an icon, determine which surface and/or volume in which to present content, generate and display graphics effects (e.g., visual feedback, visual indications and/or animations) on the surface and/or volume, and present related information corresponding to the graphic indicator. In some implementations, the electronic device 200 may determine that related information is not available for a particular detected graphic indicator (e.g., icon). In such examples, the device 200 may trigger initial motion graphics 214 and may then diminish or fade out the graphics upon determining that the related information is unavailable for display.

As shown in FIG. 2, the electronic device 200 includes a user interface system 204. The user interface system 204 includes at least a UI element generator 206, output devices 208, and input devices 210. The UI element generator 206 includes at least graphic indicators 212, motion graphics 214, and AR content 216. In general, the UI element generator 206 may generate graphic indicators 212 (e.g., icons, logos, gleams, affordances, data, button, graphic, animation, image, video, etc.), 2D or 3D AR motion graphics 214 and/or 2D or 3D AR content 216. In some implementations, the UI element generator 206 may access a boundary detector 218 to determine boundaries and/or edges of objects, surfaces, and/or other content. The boundary detector 218 may be used to place graphic indicators 212, AR motion graphics 214, and/or AR content 216 in the AR environment.

In some implementations, the AR motion graphics 214 may include animated effects with one or more animated object or text (e.g., moving elements), material design transitions, ripples, etc. presented as the AR motion graphics within a detected boundary detected by boundary detector 218. In some implementations, the animated effects include wipe effects that begin at a center, edge, or other location to push and/or animate content or effects from such locations.

In some implementations, the UI element generator 206 generates UI elements (e.g., graphic indicators 212, AR motion graphics 214, and/or AR content 216) as a particular shape, surface, object, gleam, affordance, dot, pixels, etc. For example, AR motion graphics 214 may be generated based on a predetermined connection between particular graphic indicators 212 and predefined graphics. That is, if the graphic indicator 212 is a product logo, a predefined graphic may include configuring a surface to receive the product by generating graphics that provide a 3D ripple to a center location, for example. The product may then be placed in the center after download of the product image and completion of the graphic.

The output devices 208 may include, for example, a display for visual output, a speaker for audio output, and the like. The input devices 210 may include, for example, a touch input device that can receive tactile user inputs, a microphone that can receive audible user inputs, and the like.

The device 200 also includes a tracking system 220. The tracking system 220 may track user movements, electronic device movements, and/or VR/AR object movements in the AR environment. The tracking system 220 includes at least a gesture detector 222, an AR application 225, a graphic indicator detector 224, and may utilize neural networks 226, for predicative tracking and the like.

The neural networks 226 may include detectors that operate on images to compute, for example, face locations, object locations, AR content locations, etc. in order to model predicted locations of a moving user (or moving content in the view finder of camera 202) as the user (or content) moves in the physical space. Such networks 226 may be used to place AR/MR content with respect to a moving user captured in a camera feed, for example. In some implementations, the neural networks 226 are not used by device 200.

The AR content 216 may include audio/video signals that are streamed or distributed to one or more computing devices. The AR content 216 may also include (or be retrieved from) the AR application 225 and/or other applications and algorithms that run (execute) on the device 200 to generate 3D scenes, audio signals, and/or video signals. The AR content 216 may be distributed or sent to one or more computing devices, such as the electronic device 200. In an example implementation, the AR content 216, graphic indicators 212, and/or motion graphics 214 include three-dimensional scenes, facts, executable content, reviews, address details, time-based listings, book passages, reference material, and/or images, video, and other interactive content retrieved locally on device 200 or over a network (not shown).

In some implementations, the AR application 225 may provide object surface data 228. For example, the AR application 225 may determine areas and/or volumes for objects presented in the view finder of the camera 202 of the electronic device 200. Such determinations may be used to assess which portions of the objects (or other details) in the view finder of camera 202 can be overlaid with AR content 216 and/or motion graphics 214. In some implementations, the AR content 216 and/or motion graphics 214 may include data pertaining to the graphic indicators 212. For example, such data may represent data provided by a third party information provider via AR application 225 including, but not limited to, advertisements, facts, executable content, instructions, directions, opinions, and/or options. In some implementations, the data may represent data collected from the Internet, using content retriever 230, for example, about the physical location or physical object in the view finder of the camera 202. In some implementations, the data may represent information gathered via artificial intelligence algorithms using deep machine learning and/or neural networks 226 to generate and offer actionable options and information to a user accessing electronic device 200.

The electronic device 200 may also include one or more processors including, but not limited to, a Central Processing Unit (CPU) and/or a Graphics Processing Unit (GPU) and/or a Digital Signal Processor (DSP) 232, a memory 234. Any of the elements of device 200 may include (or be programed with) machine readable instructions that are stored in the memory 234 and executed by the processor 232 (e.g., to implement the UX/UI or other functions of systems 204, 220, and sensing system 236.

The device 200 also includes a sensing system 236. In operation, electronic device 200 may also include any number of sensors and/or devices. For example, the device 200 may include (or have access to), for example, light sensors, inertial measurement unit (IMU) sensors 238, audio sensors 240, image sensors 242, image analyzer 244, depth sensors 246 (e.g., generating depth data 248), cameras 202, distance/proximity sensors (not shown), positional sensors (not shown), and/or other sensors and/or different combination(s) of sensors. Some of the sensors included in the electronic device 200 may provide for positional detection and tracking of the device 200. Some of the sensors of device 200 may provide for the capture of images of the physical environment for display on a component of the user interface system 204.

The IMU sensor 238 may function to detect, for the electronic device 200, a 3D orientation in 3D space based on the measurements taken by the IMU sensor 238. The IMU sensor 238 may include one or more accelerometers, gyroscopes, magnetometers, and other such sensors. In general, the IMU sensor 238 may detect motion, movement, velocity, and/or acceleration of the electronic device, for example. In some implementations, a pose of the electronic device 200, for example, may be detected based on data provided by the IMU sensor 238. Based on the detected pose, the electronic device 200 may update content depicted in the screen of the device 200 to reflect a changed pose of the electronic device 200 as the device is moved, for example.

The image sensors 242 may detect changes in background data associated with a camera capture as well as movement of content within the view finder of camera 202, for example. The cameras 202 may include a rear-facing capture mode and a front-facing capture mode. The front-facing capture mode may capture the user including any background scenery. The electronic device 200 may be used to detect movement and provide particular UI elements as the user moves with the electronic device 200 and to properly depict AR content in a location corresponding to the movements.

The AR application 225 may use the image analyzer 244 and/or an image buffer (not shown) to generate images for display on the electronic device 200 based on the graphic indicators 212 and any related content, such as the AR content 216. For example, one or more images captured by the cameras 202 may be stored in the image buffer for user in placing image content and/or AR content within the captured and stored images. The image analyzer 244 may determine various properties of the image, such as the location of objects and UI surfaces upon which the AR content may be positioned. In some implementations, the image analyzer 244 may analyze an image captured by cameras 202 as a basis for searching and obtaining additional related information to data represented by the captured image. Such related information can be utilized by device 200 to provide relevant facts, media, and other UI content associated with particular objects and/or graphic indicators 212 presented in the AR environment.

The depth data 248 may be captured by one or more depth sensors 246. The depth sensors 246 may capture depth data 248 to be used in 2D and/or 3D presentation of AR content on electronic device 200, for example. Such depth sensors 246 can be considered part of a depth capturing component in the sensing system 236 along with the AR application 225 to be used for characterizing the scenes captured by the cameras 202 in order to correctly represent them on a 3D display. The tracking system 220 can track the position and orientation of the users head so that the 3D presentation can be rendered with the appearance corresponding to the user's current point of view.

Any of multiple types of depth sensing or depth capturing can be used for generating depth data 248. The detected signal(s) associated with captured content from the camera 202 can be processed to generate depth data 248 corresponding to some or the entire scene. The depth data 248 may be used to assess how to place particular motion graphics 214 and/or graphic indicators 212. For example, the depth data 248 may indicate that a particular 3D graphic may be animated within a specific location in the scene. Similarly, the depth data 248 may be used to place controls or other access points to the graphics generated for animation in the scene.

The depth data 248 can include or be based on any information regarding a scene that reflects the distance between a depth sensor (e.g., the depth sensor 246) and an object in the scene. The depth data 248 reflects, for content in an image corresponding to an object in the scene, the distance (or depth) to the object. For example, the spatial relationship between the camera(s) 202 and the depth sensor 246 can be known, and can be used for correlating the images captured by the camera(s) 241 with signals from the depth sensor 246 to generate depth data 248 for the images, scenes, and/or camera feed. Depth data 248 may be used to determine boundaries for particular objects and/or motion graphics.

The GPS 250 may provide global positioning detection for the electronic device 200. The location of the user may be determined using GPS 250. The locations surrounding a user in scenes and beyond the scenes may be determined via GPS 250. AR application 225 may provide graphic indicators 212, motion graphics 214, and/or additional AR content 216 based on data retrieved via GPS 250.

The device 200 (operating on electronic device 200) may also include a control system 252. The control system 252 may include, for example, a power control device, audio and video control devices, an optical control device, and/or other such devices and/or different combination(s) of devices.

The user interface system 204, the tracking system 220, the sensing system 236, and/or the control system 252 may include more, or fewer, devices, depending on a particular implementation, and each of these systems may have a different physical arrangement than shown in FIG. 2. The device 200 may also include one or more processors (e.g., CPU/GPU/DSP 232 in communication with the systems 204, 220, 236, and/or 252, memory 234, cameras 202, and a communication module 254. The communication module 254 may provide for communication between the electronic device 200 and other external devices. Processors 232 are configured to execute instructions (e.g., computer programs) in order to carry out specific tasks. In some implementations, at least one of the processors 232 executes instructions to expose the interactivity of depth-dense UI elements to provide graphic indicators 212, motion graphics 214, and AR content 216 to a user accessing an AR environment within electronic device 200. Memory 234 may be utilized throughout communications and interactions amongst the components in electronic device 200.

In addition, the electronic device 200 may use or have access to one or more VR/AR/MR peripherals (not shown). Example peripherals may include any number of controllers, computing devices, head-mounted display devices, cameras, speakers, tracking systems, and/or other device in communication with electronic device 200.

FIGS. 3A, 3B, 3C, 3D, and 3E are diagrams schematically illustrating a UI 302 of an electronic device 300, according to an example implementation. In some implementations, the device 300 can be used to implement the device 104 of FIG. 1A and FIG. 1B. The device 300 may be the device 200 according to FIG. 2. In FIGS. 3A-3E, example approaches are described for implementing a user experience (UX) with animated visual scenes triggered by camera capture of recognized logos or other symbols. In some implementations, the UX occurring in the device 104 can be part of, and allow control of operations of the UI element generator 206, such as to implement the approaches described herein.

In each of FIGS. 3A-3E, only a portion of the example UI 302 is shown. For instance, in FIGS. 3A-3E, an upper portion (top portion) of the UI 302 is illustrated. In other UI and/or UX implementations, other arrangements of such elements, or other elements are possible.

Figure 3A:
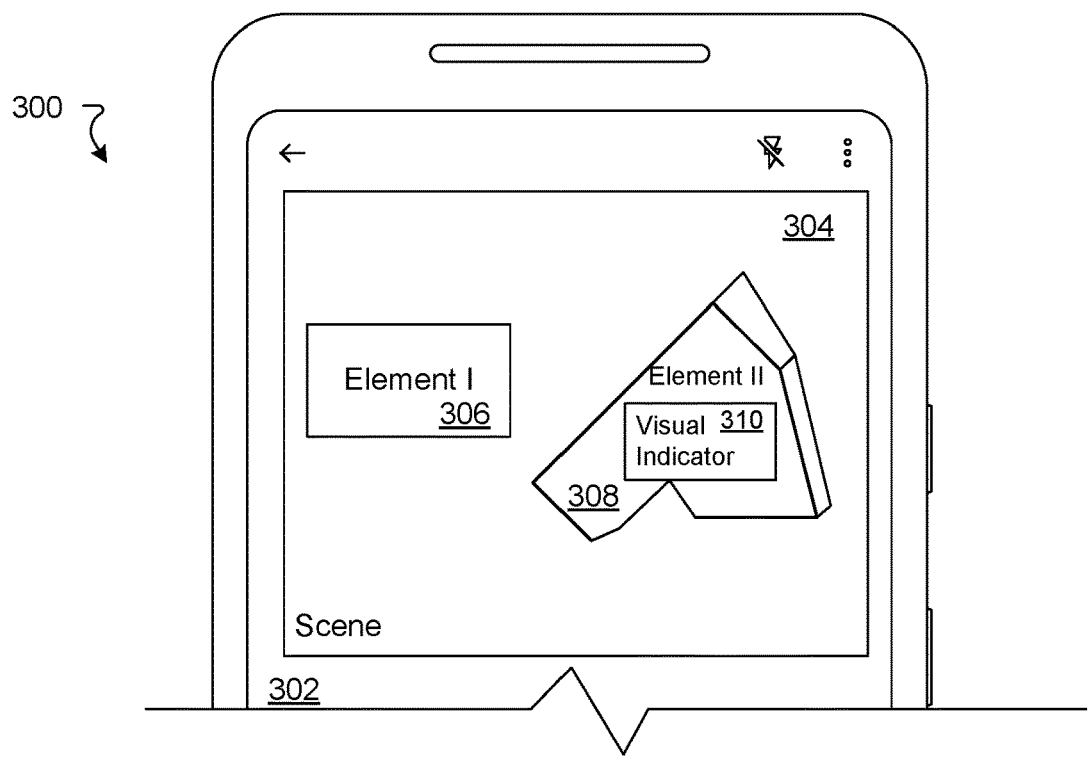
FIGS. 3A, 3B, 3C, 3D, and 3E are diagrams schematically illustrating a user interface (UI) of an electronic device, according to an example implementation.

As shown in FIG. 3A, the UI 302 includes a scene 304 including a first element 306, a second element 308, and a graphic indicator 310 (e.g., a logo). The graphic indicator 310 may be recognized by the electronic device 300, as the device 300 captures scene elements with an onboard camera. Recognizing graphic indicators, such as indicator 310, may trigger additional effects to be depicted in the UI 302.

Figure 3B:
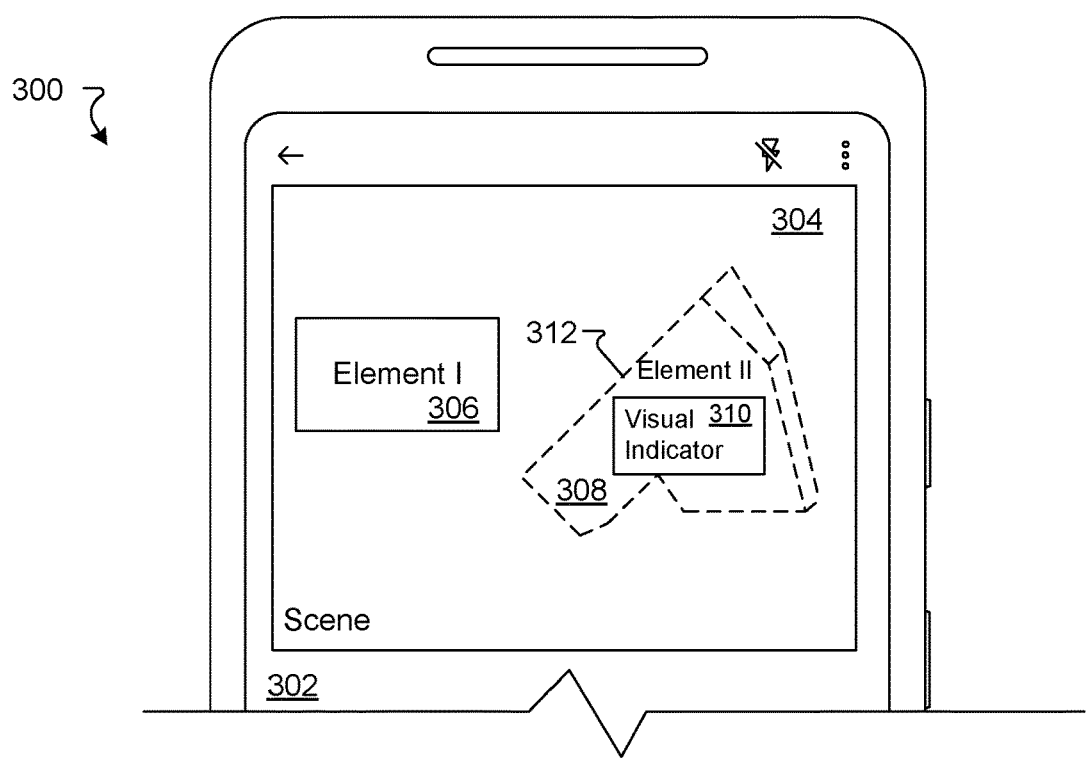

Referring to FIG. 3B, an example of the UI 302 is shown after the visual indicator 310 is recognized. In this example, the electronic device 300 recognized the visual indicator 310 in the scene 304 and identified elements 306 and 308. Since element 308 is associated with the visual indicator 310, the device 300 may determine a relevant boundary for depicting any additional content related to element 308 and/or indicator 310. For example, the device 300 may determine or detect a 3D boundary of element 308 and may indicate such a boundary, as shown by dotted lines 312, which define a volume of the element 308.

Here, the device 300 may generate such a defined boundary 312 by beginning the boundary at the indicator 310 and growing the boundary to engulf or define the entire element 308. In some implementations, the device 300 may generate a defined boundary for element 308 by selecting a single surface and indicating the surface as a defined boundary using, for example, graphic effects, animation effects, line effects, lighting effects, etc. In some implementations, the element 308 may be a virtual object and the detected boundary 312 defines a volume of the virtual object.

Figure 3C:
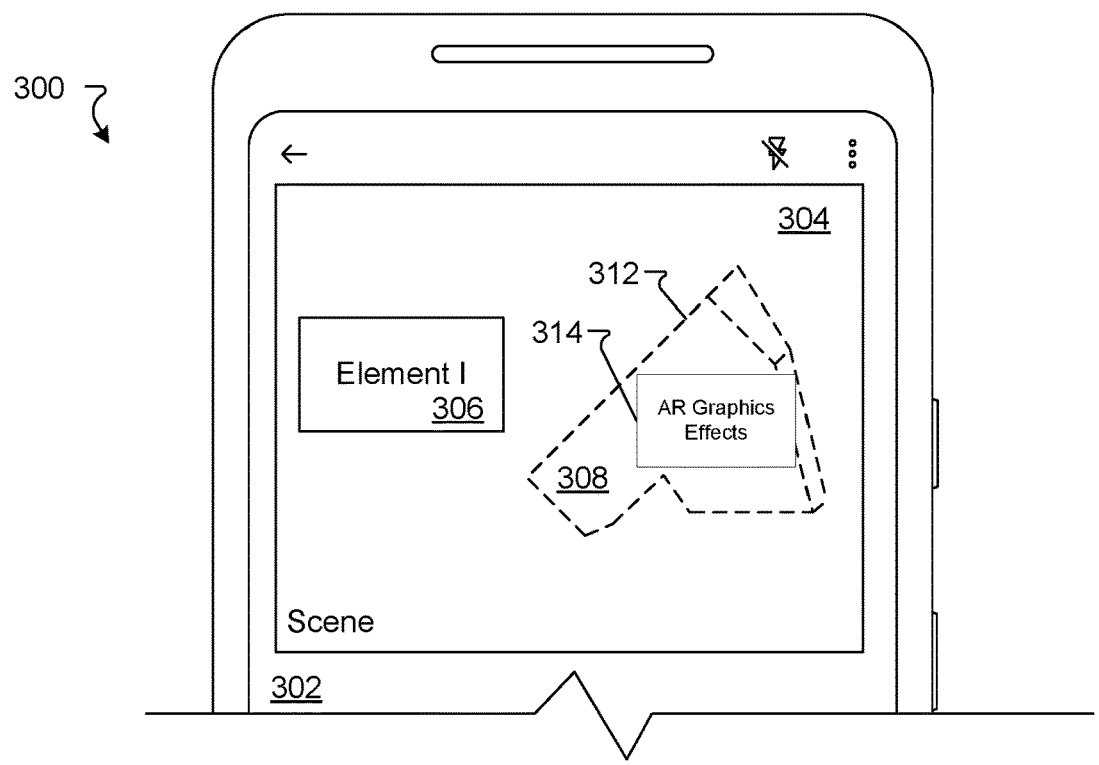

Upon defining the boundary, the device 300 may generate AR motion graphics effects 314 within the detected boundary, as shown in FIG. 3C. The AR motion graphics 314 may include animated effects initiated at a location of the at least one graphic indicator (e.g., indicator 310 in FIG. 3B) and may expand to the boundary 312. In some implementations, the graphic indicator 310 is a logo and the AR motion graphics 314 include a plurality of animated and non-overlapping shapes presented within the detected boundary, as shown by dots 126 in FIG. 1B.

Figure 3D:
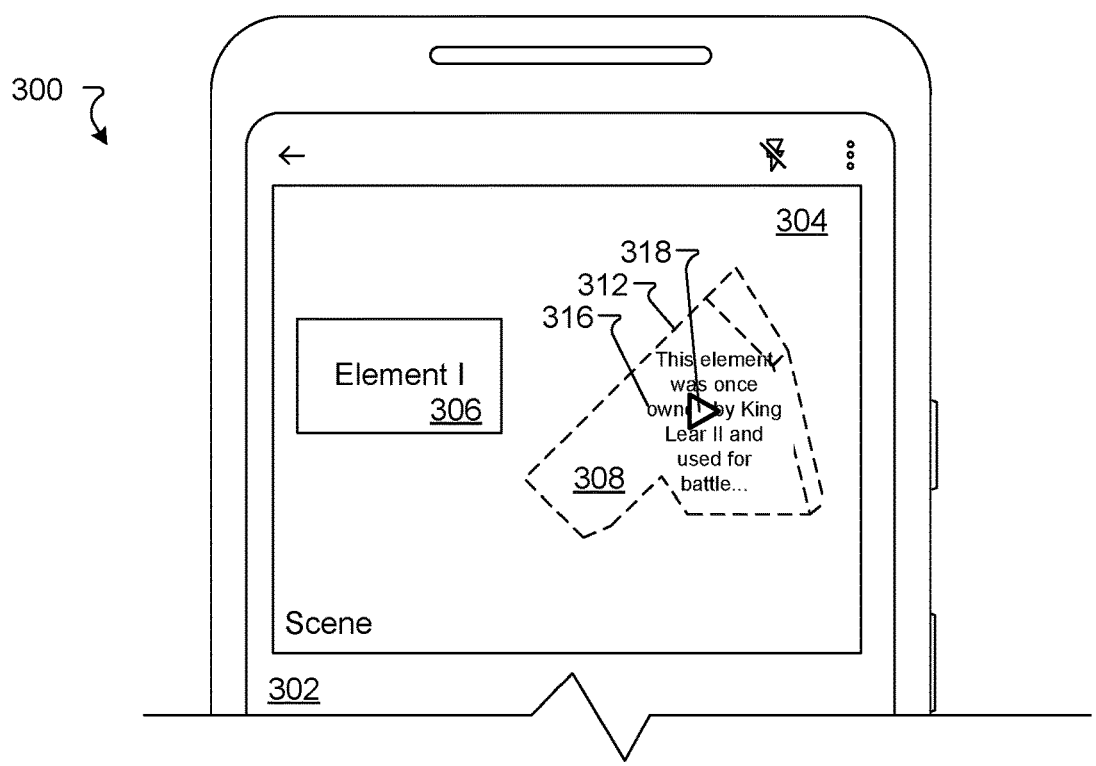

As shown in FIG. 3D, and in response to determining that content related to element 308 is available, the electronic device 300 may retrieve the content 316 and visually indicate an AR tracked control 318 on the element 308 within the viewing window of device 300. A user of device 300 may select the control 318 to access the additional information/content 316. In some implementations, the boundary 312 is configured to ensure the content 316 and control 318 remain within the element 308.

In some implementations, the AR tracked control 318 is a play button configured to initiate, in the viewing window of device 300, an immersive AR experience with the content. A user accessing the electronic device 300 may provide input at the play button (e.g., control 318) to trigger execution of the immersive AR experience. In some implementations, the AR tracked control 318 may automatically execute the graphics effects described herein via the immersive AR experience. In some implementations, the AR tracked control 318 may trigger such effects based on eye contact, head movement, location detection, and/or user gestures.

Figure 3E:
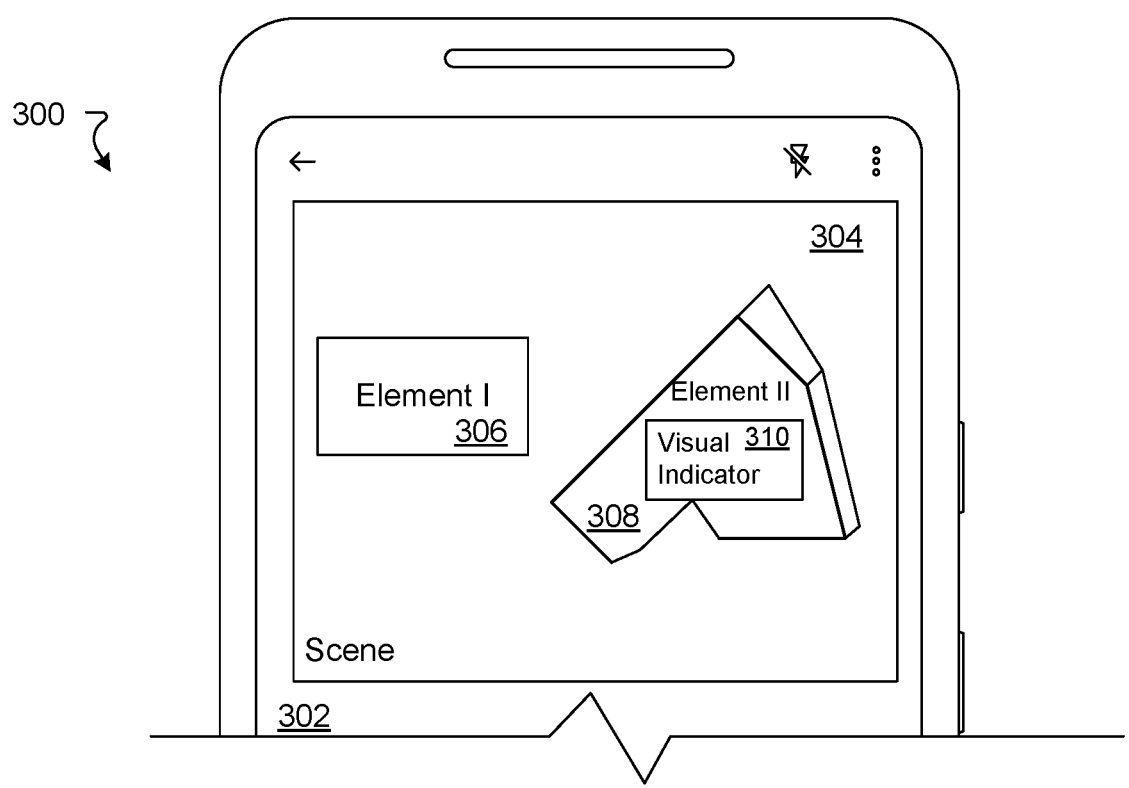

In some implementations, additional content or related content may not be available for a particular recognized logo (e.g., visual indicator 310). In such an example, the electronic device 300 may determine that no content is available and in response, may dissipate the AR motion graphics effects 314. Such dissipation may result in presenting the scene 304 without additional content, boundaries, or graphics, as shown in FIG. 3E.

FIGS. 4A, 4B, 4C, and 4D are diagrams illustrating an example sequence of generating AR motion graphics effects for a visual scene. A portion 400 of the scene 100A (FIG. 1A) is shown as the user 102 uses electronic device 104 to capture a view of the book 108 on table 110. Here, the device 104 captured a graphic indicator 402 (e.g., a logo in the book 108).

In FIGS. 4A-4D, example approaches are described for implementing a user experience (UX) with animated visual scenes triggered by camera capture of recognized logos or other symbols. In some implementations, the UX occurring in the device 104 can be part of, and allow control of operations of the UI element generator 206, such as to implement the approaches described herein. In each of FIGS. 4A-4D, only a portion of the example scene 100A is shown. In other UI and/or UX implementations, other arrangements of such elements, or other elements are possible.

Figure 4A:
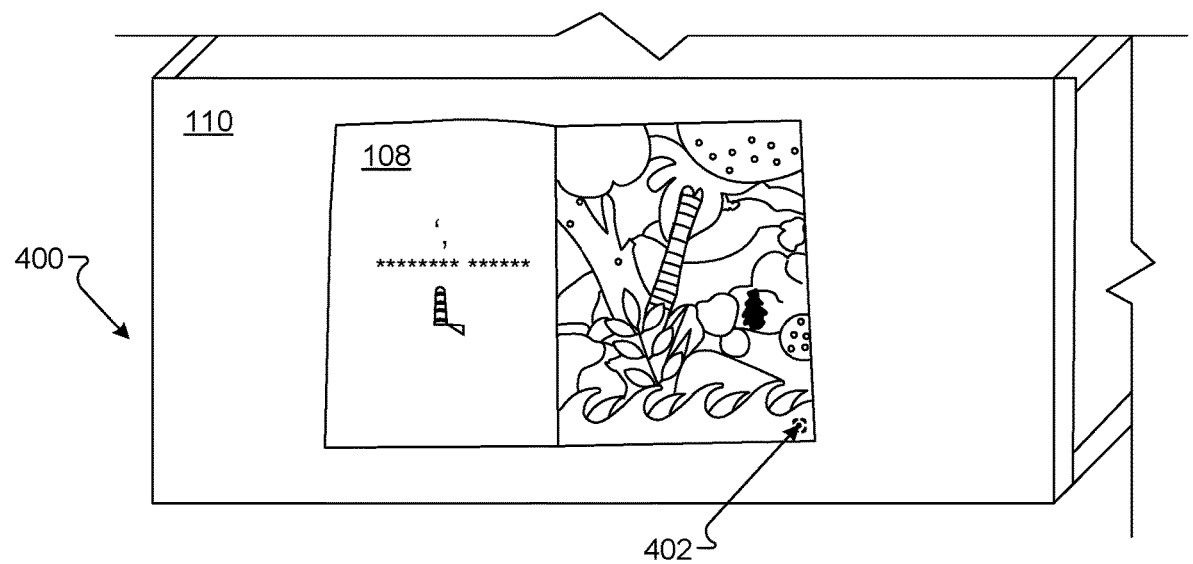
FIGS. 4A, 4B, 4C, and 4D are diagrams illustrating a sequence of generating Augmented Reality (AR) motion graphics effects for a visual scene, according to an example implementation.

As shown in FIG. 4A, the scene portion 400 includes a first element (book 108) and second element (table 110). Any number of additional elements, objects, text, applications, or other UI content may be possible. The scene portion 400 includes the graphic indicator 402 (e.g., a logo). The graphic indicator 402 may be recognized by the electronic device 104, as the device 104 captures scene elements with an onboard camera. Recognizing graphic indicators, such as indicator 402, may trigger additional effects to be depicted in the UI presented in scene portion 400.

Figure 4B:
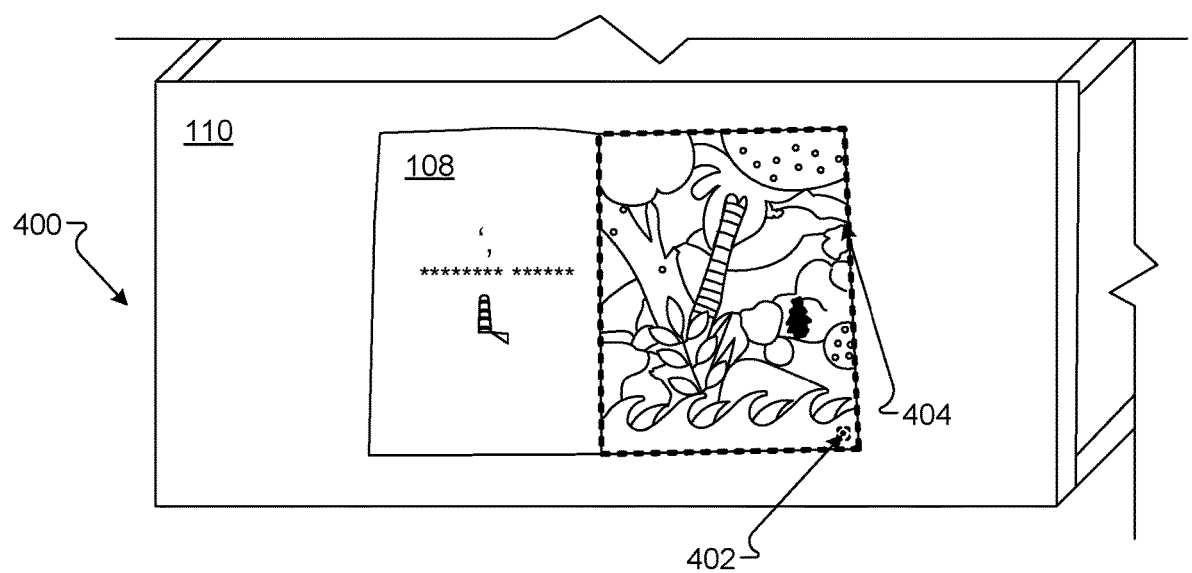

Referring to FIG. 4B, an example of the scene portion 400 is shown after the visual indicator 402 is recognized. In this example, the electronic device 104 recognized the visual indicator 402 and identified elements 108 and 110. Since the element (e.g., book 108) is associated with the visual indicator 402, the device 104 may determine a relevant boundary 404 for depicting any additional content related to the book 108 and/or indicator 402. For example, the device 104 may determine or detect a 3D boundary of element 108 and may indicate such a boundary, as shown by dotted lines 404, which define a surface of the book 108.

Here, the device 104 may generate such a defined boundary 404 by beginning the boundary at the graphic indicator 402 (e.g., icon, logo) and growing the boundary to engulf or define the entire surface of book 108. In some implementations, the book 108 may be a virtual object depicted for view in the viewing window of device 104 and the indicator 402 and other effects described herein may be applied to the virtual object (as AR content). For example, the defined boundary 404 may be detected as the edges (or surface) of the virtual object book 108. The boundary 404 may then be configured to contain (e.g., restrict to the boundary) any applied AR motion graphics.

Figure 4C:
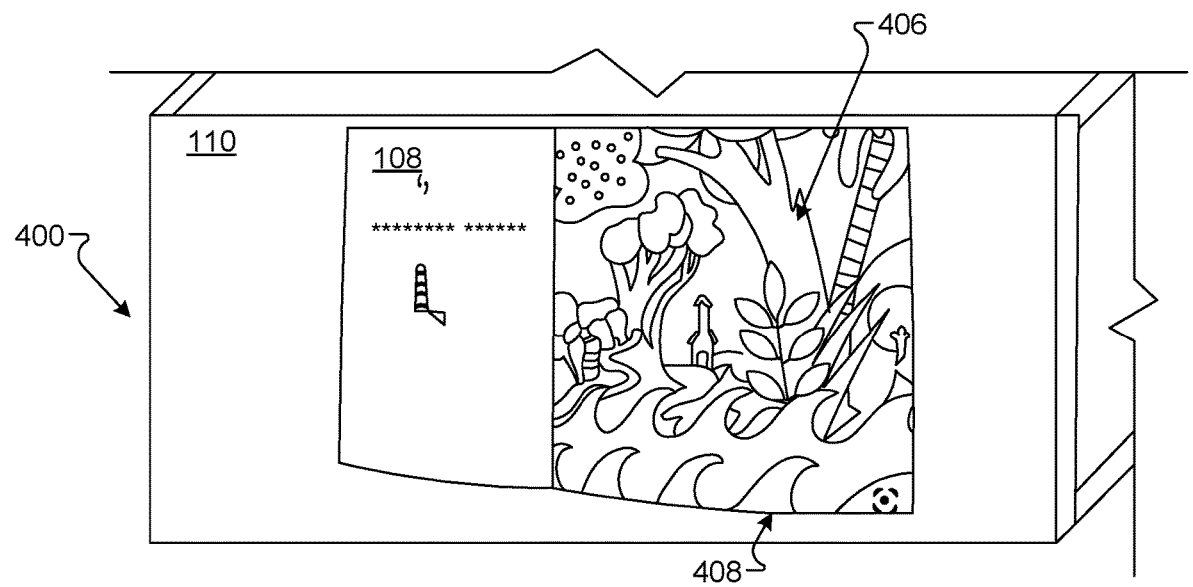

Upon defining the boundary, the device 104 may generate AR motion graphics effects 406/408 within the detected boundary of the book 108, as shown in FIG. 4C. The AR motion graphics 406/408 may include animated effects initiated at a location of the at least one graphic indicator (e.g., indicator 402 in FIG. 4B) and may expand to the boundary 404.

In this example, the device 104 generated AR motion graphics 406/408 that moved the already present content in the book 108. In FIG. 4C, the water 408 has moved from the water locations depicted in FIG. 4B. Similarly, the tree 406 has moved from the tree locations depicted in FIG. 4B.

Figure 4D:
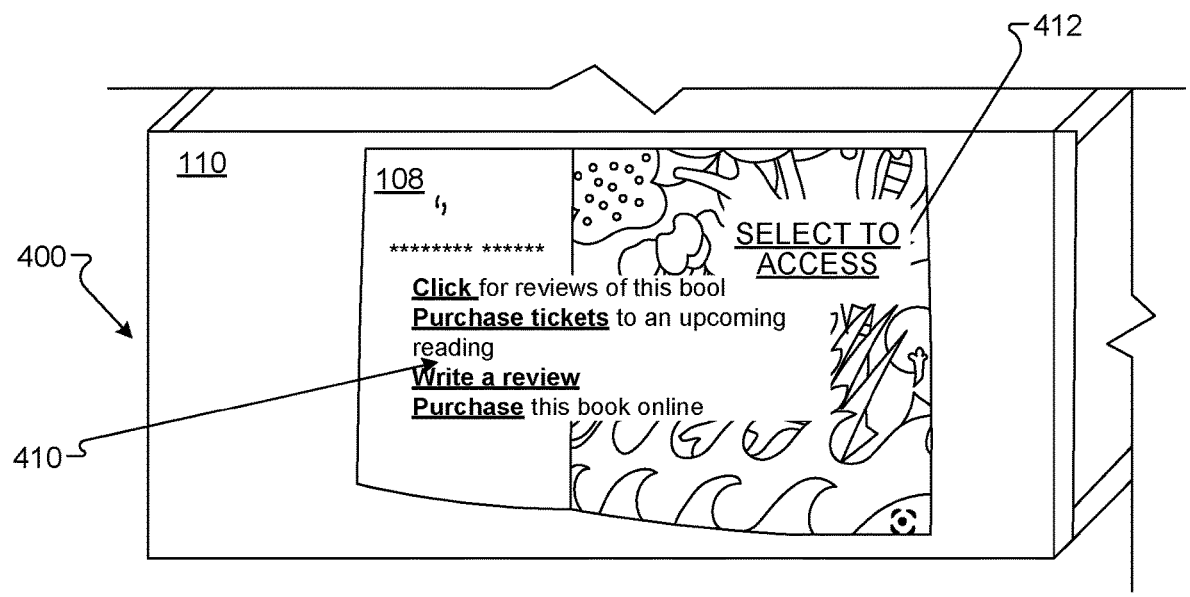

As shown in FIG. 4D, and in response to determining that content related to element 108 is available, the electronic device 104 may retrieve the content 410 and visually indicate an AR tracked control 412 on the element 108 within the viewing window of device 104. A user of device 104 may select the control 412 to access the additional information/content 410.

Figure 5:
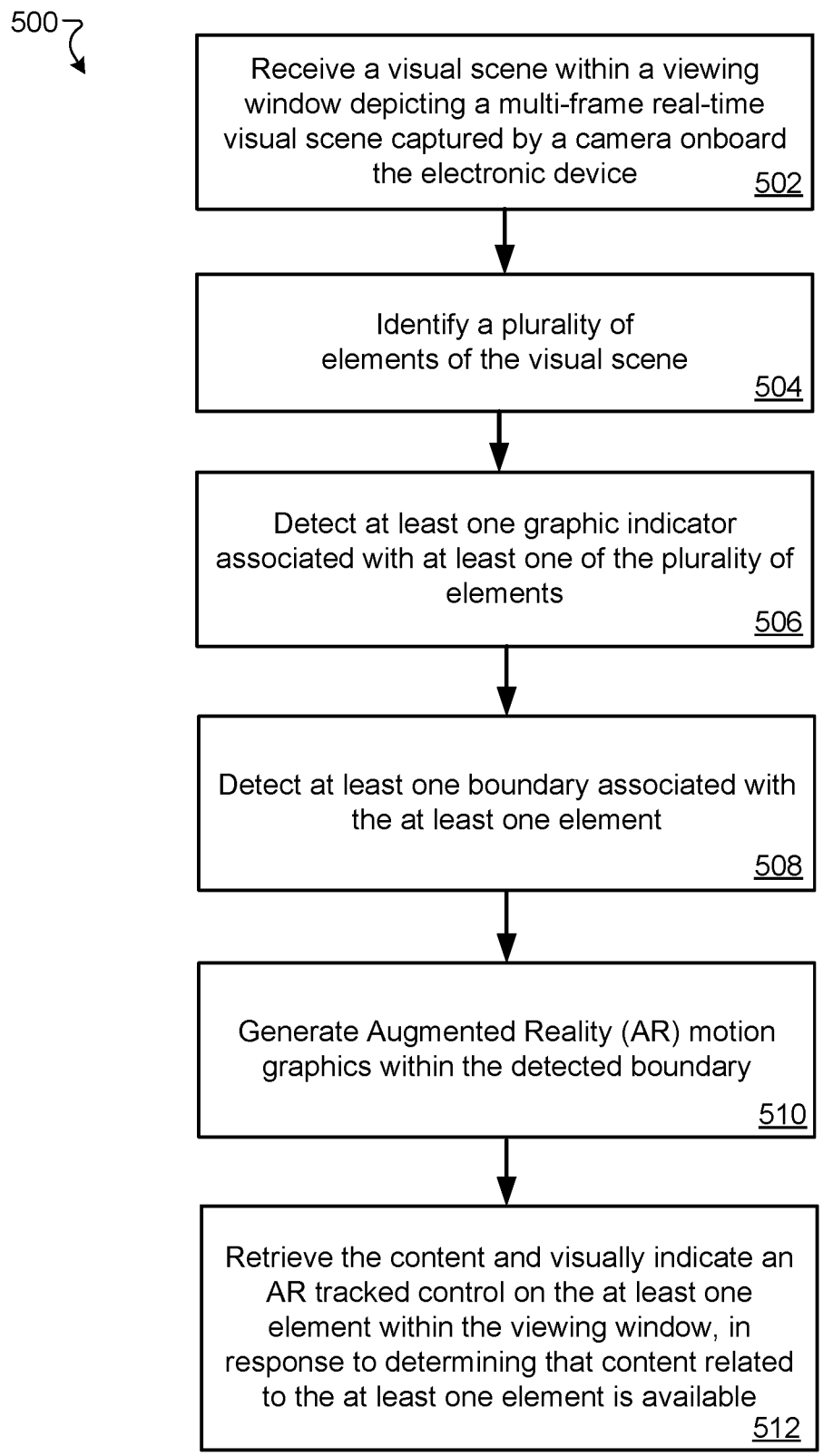
FIG. 5 is a flow diagram of an example process of implementing a user experience (UX) with animated visual scenes triggered by camera capture of recognized logos, in accordance with implementations described herein.

FIG. 5 is a flow diagram of an example process 500 of implementing a user experience (UX) with animated visual scenes triggered by camera capture of recognized logos, in accordance with implementations described herein. The process 500 is described with respect to an example implementation of the electronic device described in FIG. 2 and/or system 600, but it will be appreciated that the process 500 can be implemented by devices and systems having other configurations.

At block 502, the process 500 may include receiving, by an electronic device, a visual scene within a viewing window depicting a multi-frame real-time visual scene captured by a camera onboard the electronic device. For example, an electronic device 200 may receive a visual scene 201 that is captured by an onboard camera. In some implementations, the visual scene 201 also includes additional AR and/or VR content combined with camera-captured content.

At block 504, the process 500 may include identifying, by the electronic device, a plurality of elements of the visual scene. For example, the electronic device 200 may identify elements such as book 108 and table 110 in a scene portion 400. Identifying such elements may be performed alone or in combination by the boundary detector 218, the graphic indicator detector 224, the image sensors 242, AR application 225, and/or depth sensors 246.

At block 506, the process 500 may include detecting, by the electronic device and based on the plurality of elements identified in the visual scene, at least one graphic indicator associated with at least one of the plurality of elements. For example, the electronic device 200 may detect one or graphic indicators, such as logo 402, using graphic indicator detector 224.

At block 508, the process 500 may include detecting, by the electronic device, at least one boundary associated with the at least one element. For example, the electronic device 200 may use boundary detector 218 to detect a surface, edge, volume, or other defined location on book 108 or table 110. Such a boundary may be used to display additional AR content in a scene 400.

At block 510, the process 500 may include generating, in the viewing window and based on the detection of the at least one graphic indicator, AR motion graphics within the detected boundary. For example, the electronic device 200 may generate AR motion graphics, such as animations, virtual objects, or other graphic that may be rendered within the defined boundary 404, for example. The AR motion graphics may indicate additional information is being downloaded. In some implementations, the AR motion graphics correspond to the logo and information about the logo. In some implementations, the AR motion graphics include animating scene elements within a captured scene. For example, the book 108 includes graphics that may be animated upon the device 200 detecting the graphic indicator 402.

At block 512, the process 500 may include retrieving the content and visually indicating an AR tracked control on the at least one element within the viewing window, in response to determining that content related to the at least one element is available. For example, the electronic device 200 may retrieve content associated with indicator 402 and/or information about book 108 responsive to determine that such information exists. For example, the device 200 may generate a search query to gather information about book 108. In another example, the device 200 may retrieve data encoded by the graphic indicator 402 from a private database, for example. In some implementation, while retrieving any or all of the above information, the electronic device may generate the AR tracked control (e.g., a selectable element), such as retrieval link 412, to provide access to the information when a user wishes to view such information. The AR tracked control may be tracked in six degrees of freedom to ensure the control may move in the scene as the user or device 200 is moved in the physical world.

Figure 6:
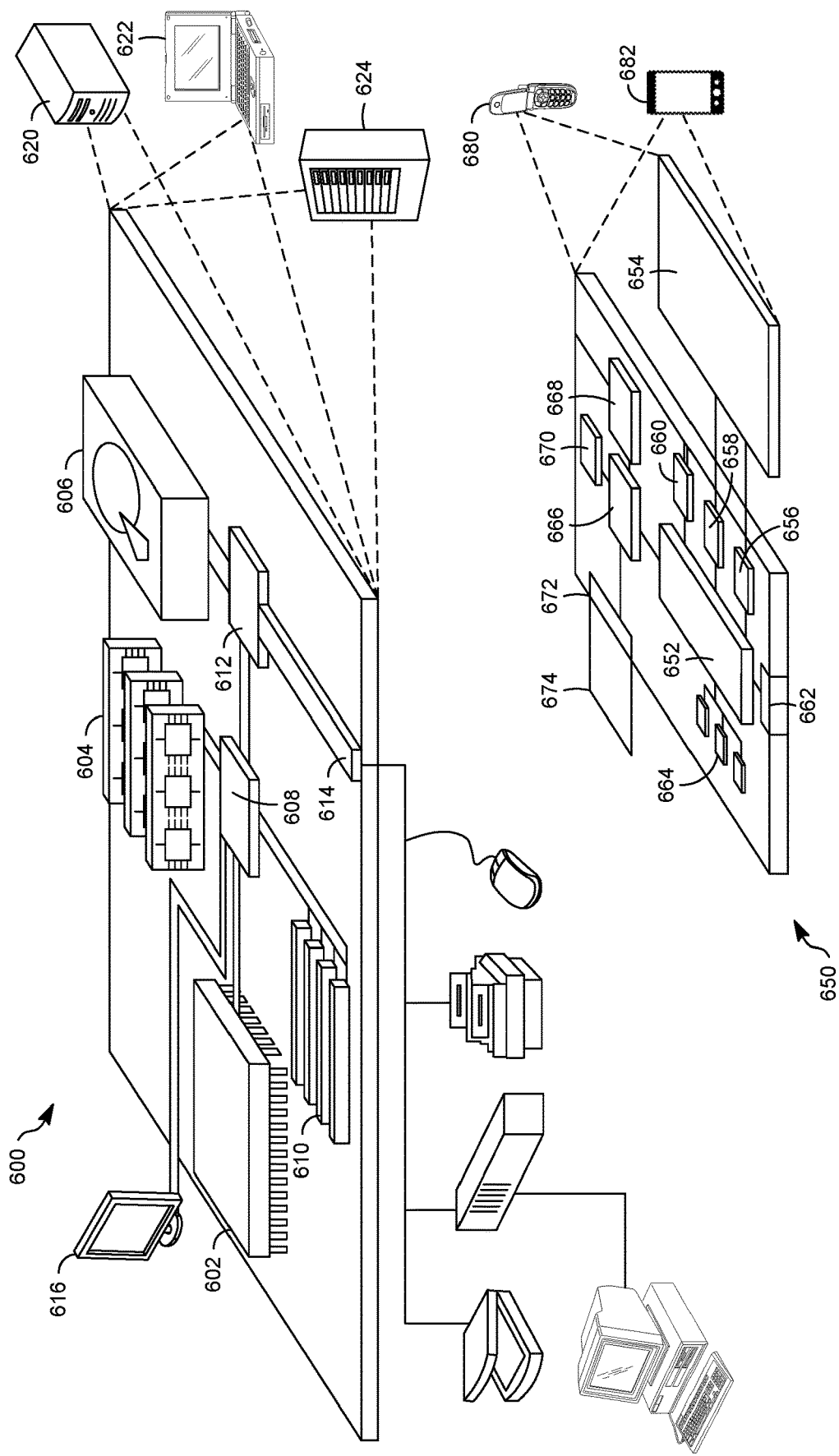
FIG. 6 is an example of a computing device and a mobile computing device that can be used to implement the techniques described herein.

FIG. 6 shows an example computer device 600 and an example mobile computer device 650, which may be used with the techniques described here. Features described with respect to the computer device 600 and/or mobile computer device 650 may be included in the device 200 described above. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the subject matter described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. The various techniques described herein may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

The computing device according to example embodiments described herein may be implemented using any appropriate combination of hardware and/or software configured for interfacing with a user including a user device, a user interface (UI) device, a user terminal, a client device, or a customer device. The computing device may be implemented as a portable computing device, such as, for example, a laptop computer. The computing device may be implemented as some other type of portable computing device adapted for interfacing with a user, such as, for example, a PDA, a notebook computer, or a tablet computer. The computing device may be implemented as some other type of computing device adapted for interfacing with a user, such as, for example, a PC. The computing device may be implemented as a portable communication device (e.g., a mobile phone, a smart phone, a wireless cellular phone, etc.) adapted for interfacing with a user and for wireless communication over a network including a mobile communications network.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," "proximate," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 60 degrees or at other orientations) and the spatially relative descriptors used herein may be interpreted accordingly.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, all terms (including technical and scientific terms) used herein have the same meaning as commonly understood by one of ordinary skill in the art to which this present inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

In some implementations, a computing device 650 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the subject matter described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
    receiving, by an electronic device, a visual scene within a viewing window depicting a multi-frame real-time visual scene captured by a camera onboard the electronic device;
    identifying, by the electronic device, a plurality of elements of the visual scene;
    detecting, by the electronic device and based on the plurality of elements identified in the visual scene, at least one graphic indicator associated with at least one element of the plurality of elements;
    detecting, by the electronic device, at least one boundary associated with the at least one element;
    generating, while additional content is being retrieved and based on the detection of the at least one graphic indicator, Augmented Reality (AR) motion graphics within the detected at least one boundary; and
    in response to determining that the additional content related to the at least one element is available, retrieving the additional content and visually indicating an AR tracked control on the at least one element within the viewing window.

2. The computer-implemented method of claim 1, further comprising:
    in response to determining that the additional content related to the at least one element is unavailable, dissipating the AR motion graphics.

3. The computer-implemented method of claim 1, wherein the AR motion graphics include animated effects initiated at a location of the at least one graphic indicator and expanded to the at least one boundary, the animated effects including moving elements presented within the detected at least one boundary.

4. The computer-implemented method of claim 1, wherein:
    the AR tracked control is a play button configured to initiate, in the viewing window, an immersive AR experience with the additional content; and
    receiving, from a user accessing the electronic device, input at the play button triggers execution of the immersive AR experience.

5. The computer-implemented method of claim 1, wherein the detected at least one boundary defines an edge of the at least one element, the defined edge configured to contain the AR motion graphics to a portion of the visual scene.

6. The computer-implemented method of claim 1, wherein:
    the at least one graphic indicator is a logo; and
    the AR motion graphics include a plurality of animated and non-overlapping shapes presented within the detected at least one boundary.

7. The computer-implemented method of claim 1, wherein the at least one element is a virtual object; and
    the detected at least one boundary defines a surface of the virtual object.

8. The computer-implemented method of claim 1, wherein the at least one element is a virtual object; and
    the detected at least one boundary defines a volume of the virtual object.

9. The computer-implemented method of claim 1, wherein the additional content is based on a geographic location of the electronic device.

10. A computer program product tangibly embodied on a non-transitory computer-readable storage medium and comprising instructions that, when executed by at least one computing device, are configured to cause the at least one computing device to:
    receive, by an electronic device, a visual scene within a viewing window depicting a multi-frame real-time visual scene captured by a camera onboard the electronic device;
    identify, by the electronic device, a plurality of elements of the visual scene;
    detect, by the electronic device, at least one boundary associated with at least one element of the plurality of elements;
    generate, during a search query for additional content, Augmented Reality (AR) motion graphics within the detected at least one boundary; and
    in response to determining that the additional content related to the at least one element is available, retrieve the additional content and visually indicating an AR tracked control on the at least one element within the viewing window.

11. The computer program product of claim 10, further comprising:
    in response to determining that the additional content related to the at least one element is unavailable, dissipating the AR motion graphics.

12. The computer program product of claim 10, wherein the AR motion graphics include animated effects initiated at a location of at least one graphic indicator and expanded to the at least one boundary, the animated effects including moving elements presented within the detected at least one boundary.

13. The computer program product of claim 10, wherein the detected at least one boundary defines an edge of the at least one element, the defined edge configured to contain the AR motion graphics to a portion of the visual scene.

14. The computer program product of claim 12, wherein:
    the at least one graphic indicator is a logo; and
    the AR motion graphics include a plurality of animated and non-overlapping shapes presented within the detected at least one boundary.

15. A system comprising:
    at least one processor;
    memory storing instructions that, when executed by the at least one processor, cause the system to perform operations including:

receiving a visual scene within a viewing window depicting a multi-frame real-time visual scene captured by a camera associated with the at least one processor;

identifying a plurality of elements of the visual scene;

detecting, based on the plurality of elements identified in the visual scene, at least one graphic indicator associated with at least one element of the plurality of elements;

detecting at least one boundary associated with the at least one element;

generating, while a search query for additional content is performed and based on the detection of the at least one graphic indicator, Augmented Reality (AR) motion graphics within the detected at least one boundary; and in response to determining that content related to the at least one element is available, retrieving the additional content and visually indicating an AR tracked control on the at least one element within the viewing window.

16. The system of claim 15, further comprising:
in response to determining that additional content related to the at least one element is unavailable, dissipating the AR motion graphics.

17. The system of claim 15, wherein the AR motion graphics include animated effects initiated at a location of the at least one graphic indicator and expanded to the at least one boundary, the animated effects including moving elements presented within the detected at least one boundary.

18. The system of claim 15, wherein the detected at least one boundary defines an edge of the at least one element, the edge configured to contain the AR motion graphics to a portion of the visual scene.

19. The system of claim 15, wherein:
the at least one graphic indicator is a logo; and
the AR motion graphics include a plurality of animated and non-overlapping shapes presented within the detected at least one boundary.

20. The system of claim 15, wherein the at least one element is a virtual object; and
the detected at least one boundary defines a volume of the virtual object.

* * * * *